July 23, 1968          L. J. WOLF          3,393,579

CONTROL CABLE COUPLING

Original Filed April 22, 1963

INVENTOR
LLOYD J. WOLF

BY Bedell & Burgess
ATTORNEYS

United States Patent Office 3,393,579
Patented July 23, 1968

3,393,579
CONTROL CABLE COUPLING
Lloyd J. Wolf, 2425 Irving Blvd.,
Dallas, Tex. 75207
Application May 2, 1966, Ser. No. 546,882, now Patent No. 3,326,314, dated June 20, 1967, which is a division of application Ser. No. 274,599, Apr. 22, 1963, now Patent No. 3,255,837, dated June 14, 1966. Divided and this application May 31, 1967, Ser. No. 655,700
2 Claims. (Cl. 74—501)

ABSTRACT OF THE DISCLOSURE

An easily connectable and disconnectable coupling for transmitting axial movements between axially aligned rods or flexible control cable ends in which one of the rods mounts a collar near its free end and the other rod has an outwardly threaded fitting with an axial recess open along one side ot receive the free end of the one rod and a groove in the recess side walls to receive the collar, the one rod mounting for axial movement an inwardly threaded fitting for threadably engaging the outwardly threaded fitting on the other rod to close the open side of the recess and thereby retain said collar in the groove.

---

This application is a division of my application Ser. No. 546,882, filed May 2, 1966, now Patent No. 3,326,314 as a division of Ser. No. 274,599 filed Apr. 22, 1963, now Patent 3,255,837.

The invention relates to couplings for transmitting axial movements between a pair of aligned control cables or other rod-like members.

Where manual gear shifts are used on a pair of coupled vehicles, it is desirable to have them interconnected in such a way that shifting of one will cause simultaneous identical shifting of the other and it is necessary that the clutch on the unmanned vehicle be disengageable responsive to disengagement of the clutch on the manned vehicle and that the clutch on the unmanned vehicle be maintained disengaged throughout the shifting operation to prevent damage to the transmission of the unmanned vehicle.

An object of the invention is to provide an easily connectable and disconnectable coupling between a pair of aligned rods or control cables as exemplified by separate control cables mechanically connected respectivey to the manual gear shift lever of each of a pair of vehicles for reproducing the movements of the lever in the control vehicle on the gear shift lever in the unmanned vehicle.

The foregoing and additional objects and advantages will be evident from the following description and the accompanying drawings, in which.

Figure 1:
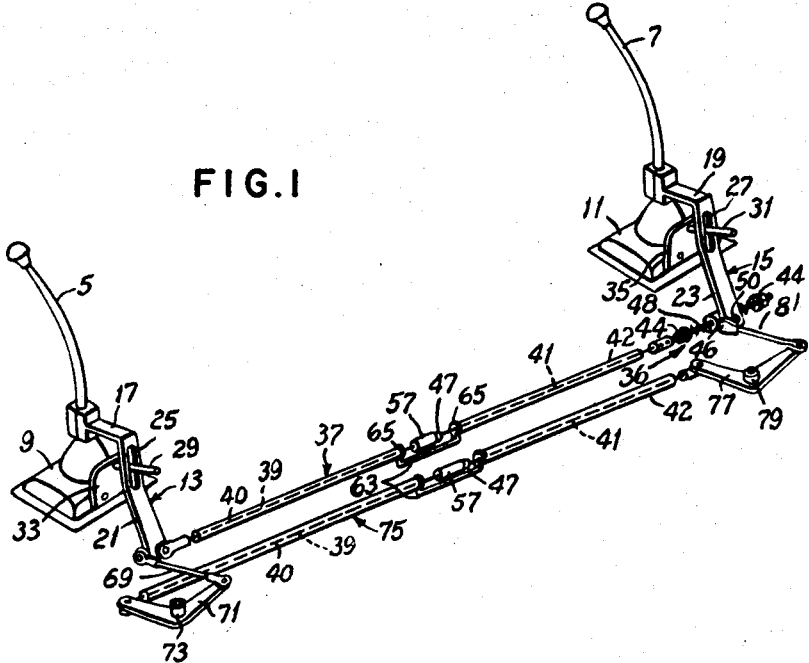
FIG. 1 is a perspective view of a gear shift control system embodying the invention.

Each of a pair of coupled motor vehicles has a manual gear shift control including the usual hand levers 5 and 7 mounted in bases 9 and 11 on the floor of the vehicle cab, shifting of the gears in each vehicle being effected by combinations of fore-and-aft and transverse movements of levers 5 and 7. For causing lever 7 to reproduce the movements of lever 5, both levers are provided with inverted generally L-shaped arms 13 and 15, with their horizontal legs 17 and 19 fixed to the lower exposed portion of the lever and extending transversely of the vehicle. Their upright legs 21 and 23 are formed with vertical, or lengthwise slots 25 and 27. Fulcrum pins 29 and 31 are transversely aligned with the pivot points of levers 5 and 7 and affixed, by means of brackets 33 and 35, to bases 9 and 11. Pins 29 and 31 extend transversely therefrom through slots 25 and 27 in the upright legs 21 and 23 of arms 13 and 15, so that fore-and-aft movements of levers 5 and 7 will produce corresponding reverse movements of the lower ends of legs 21 and 23, and transverse movements of levers 5 and 7 will produce corresponding transverse movements of the lower ends of legs 21 and 23.

The lower ends of legs 21 and 23 are connected by a flexible motion-transmitting cable system 37 which consists of a length of sheathed cable 39 attached to the lower end of arm 13, and a similar length of cable 41 attached by means of lost motion connector 36 to the lower end of arm 15, cable 39 terminating at the rear end of forward motor vehicle 1 and cable 41 terminating at the forward end of rear motor vehicle 3. Lost motion connector 36 (as best seen in FIG. 7) comprises a rod or bolt 38 connected to the end of cable 41 adjacent arm 15, and fixedly mounting a pair of spaced collars or washers 44. Intermediate washers 44 and apertured block 46 is slidably mounted on rod 38 and is normally centered between collars 44 by springs 48, which are mounted on rod 38 between block 46 and collars 44. Block 46 is attached to the end of arm 15 by a threaded stud 50, so that, when cable 41 is translated by fore-and-aft shifting movements or gear shift lever 5 in the lead vehicle, if the gears of the trailing vehicle are out of registry, springs 48 will yield, permitting rod 38 to slide through block 46, until the gears come into registry; when this occurs, springs 48 will center block 46, causing the desired movement of lever 7 and completion of the shift. The rear end of cable 39 and the forward end of cable 41 terminate in rod portions 43 and 45, which project respectively from sheaths 40 and 42 of cables 39 and 41. A male fitting 47 is mounted on and pinned at 49 to the forward end of rod portion 45. Male fitting 47 is of generally cylindrical shape and its forward portion is formed with a recess 51 of U-shape in transverse section with the curved portion of the U concentric with the axis of the fitting, and intermediate its ends, recess 51 is formed with a transverse groove 53, also of U-shape. Forward rod portion 43 is provided with a collar 55 near its extremity and collar 55 is adapted to be fitted into groove 53 in male fitting 47 with rod 43 received in recess 51. A female fitting 57 is threadably or slidably mounted on rod member 43 and its recess is interiorly threaded as at 59 for engagement with the exterior threads 61 on the male member 47 so that when collar 55 is seated in groove 53, rod 43 can be held in fixed relation to rod 45 by tightening female member 57 on male member 47. For maintaining the sheaths 40 and 42 of the cable in fixed spaced relation, a clamping bar 63 is provided with upstanding ends 65 forked for reception in suitable slots 67 in the end portions of the cable sheaths 40 and 42. With this arrangement, it will be evident that any axial movements transmitted to cable 39, as a result of fore-and-aft movements of lever 5, will be transmitted through cable 39, threaded rod 45, cable 41, and lost motion connector 36, to arm 15, causing corresponding rotation of upright leg 23 about fulcrum pin 31 and thus producing the same fore-and-aft movement of lever 7 as was initiated by lever 5.

For transmitting transverse movements of lever 5, the lower end of arm 13 is connected by means of a transversely extending link 69 to an arm of a bell crank 71 fulcrumed at 73 on motor vehicle 1 and extending generally lengthwise thereof. The other arm of bell crank 71 extends generally transversely of the vehicle and is connected by means of a flexible cable system 75, similar in construction and operation to cable system 37, to a transversely extending arm of a bell crank 77 fulcrumed at 79 on motor vehicle 3. The other arm of bell crank 79 extends lengthwise of vehicle 3 and is connected by a transversely extending link 81 to the lower end of arm 15 so that any transverse movements of gear shift lever 5, acting through link 69, bell crank 71, flexible cable arrangement 75, bell crank 77 and link 81, will cause a corresponding transverse movement of gear shift lever 7 in motor vehicle 3.

Figure 2:
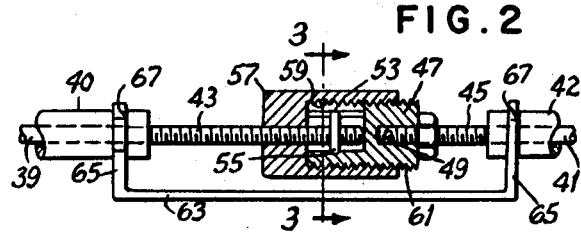
FIG. 2 is an enlarged view, partially sectionalized, of the control cable connector portion of the gear shift control system.
Figure 3:
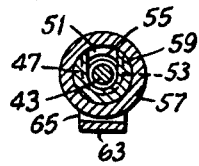
FIG. 3 is a transverse vertical sectional view along line 3—3 of FIG. 2.
Figure 4:
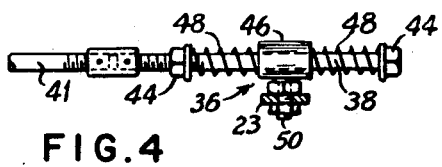
FIG. 4 is an enlarged view of the lost motion connection of the gear shift control system.

Operation of the invention is as follows: To secure the gear shift systems of the two vehicles in operative relation, clamp 63 is attached to the adjacent ends of cable sheaths 40 and 42, collar 55 on the protruding threaded rod end 43 of cable 39 is seated in U-slot 53 of male coupling fitting 47, female fitting 57 is rotated on or slid along rod 43 until it threadably engages the male fitting 47 and is rotated until the two fittings are secured in the position shown in FIG. 2, in which the male fitting abuts the forward end of the recess in the female fitting. Cable system 75 is then similarly connected, so that all axial movements of the forward cables will be transmitted exactly to the rear cables. Gear shift lever 5 of the leading vehicle is thereupon manipulated as desired either by a transverse movement or a fore-and-aft movement or a combination of both movements, which movements are transmitted by means of arm 13, cable systems 37 and 75 and arm 15 to gear shift lever 7 of the trailing vehicle 3.

The invention may be modified in various respects as will occur to those skilled in the art and the exclusive use of all modifications as come within the scope of the appended claims is contemplated.

What is claimed is:
1. A coupling for transmitting axial movements between a pair of aligned rods comprising a female fitting mounted on one of said rods for axial movement therealong and having an axial recess opened toward the adjacent end of the rod, a collar rigidly mounted on said one rod between the mounting thereon of said female fitting and the adjacent extremity of said rod, a male fitting fixedly mounted on the adjacent end of the other rod and having an axial recess open at one side and adapted to receive the end portion of said one rod and a groove in the side walls of said male fitting receiving said collar, said female fitting threadably receiving said male fitting by axially moving and rotating said female fitting along and about said one rod.

2. A coupling for sheathed control cables having a sheath and a cable axially movable therein comprising means for holding the adjacent ends of the cable sheaths against relative axial movement, the end portions of the cables protruding from the ends of the sheaths, a female fitting mounted on the protruding end portion of said one cable for axial movement therealong and having an axial recess open toward the free end, a collar rigidly mounted on the protruding portion of said one cable between the mounting thereon of said female fitting and the free end thereof, a male fitting fixedly mounted on the protruding portion of the other cables and having an axial recess open at one side and receiving the free end of said one cable and a groove in the side walls of said male fitting receiving said collar, said female fitting threadably receiving said male fitting by axially moving and rotating said female fitting along and about said protruding end of said one cable.

References Cited
UNITED STATES PATENTS

| | | | |
|---|---|---|---|
| 1,126,176 | 1/1915 | Baker et al. | 287—59 X |
| 2,719,741 | 10/1955 | Buvelot | 287—59 |

MILTON KAUFMAN, *Primary Examiner.*